FIP8301 XR 2,793,826 SR CROSS REFERENCE SEARCH ROOM

May 28, 1957 W. A. FIEDLER 2,793,826

SPLIT AIRCRAFT WING

Filed March 23, 1956 3 Sheets-Sheet 1

INVENTOR.
WILLY A. FIEDLER
BY F. J. Schmitt
George J. Rubens
ATTORNEYS

May 28, 1957 W. A. FIEDLER 2,793,826

SPLIT AIRCRAFT WING

Filed March 23, 1956 3 Sheets-Sheet 2

INVENTOR.
WILLY A. FIEDLER

BY [signature]
[signature] ATTORNEYS

May 28, 1957 W. A. FIEDLER 2,793,826

SPLIT AIRCRAFT WING

Filed March 23, 1956 3 Sheets-Sheet 3

INVENTOR.
WILLY A. FIEDLER

BY [signature]
[signature]
ATTORNEYS

United States Patent Office 2,793,826

Patented May 28, 1957

2,793,826

SPLIT AIRCRAFT WING

Willy A. Fiedler, Woodland Hills, Calif.

Application March 23, 1956, Serial No. 573,570

6 Claims. (Cl. 244—43)

(Granted under Title 35, U. S. Code (1952), sec. 266)

The invention described herein may be manufactured and used by or for the Government of the United States of America for governmental purposes without the payment of any royalties thereon or therefor.

The present invention relates to a split aircraft wing and more particularly to an aircraft structure wherein each of the main wings of an aircraft is provided with an auxiliary forewing which is adapted to pivot forward and downwardly with respect to the main wings for reducing the minimum safe flying speed of such aircraft in order particularly to avoid wing tip stalling at low speeds such as when landing. The present application is a continuation-in-part of the parent U. S. patent application Serial No. 320,164, now Patent No. 2,743,887.

The aerodynamic drag of aircraft wings at high speeds is decreased by means of sweepback. However, this advantage in aircraft having sweptback wings is offset by the fact that sweepback increases the danger of wing tip stalling at low speeds, requiring landing of such craft at comparatively high and dangerous speeds. This problem is particularly acute with respect to landing such aircraft on aircraft carriers having necessarily limited landing space and also with respect to transport type aircraft.

As pointed out in U. S. Patent No. 2,111,274, the desirability of providing, in conventional aircraft, a wing structure which at the same time has a low drag coefficient while the plane is in flight and has a high lift coefficient during takeoff and landing, has long been recognized. Various wing structures have accordingly been proposed in an effort to achieve this goal, mainly in the form of structures providing variable wing area. However, the prior art structures are complicated and have not solved the major problem of wing tip stalling, particularly in connection with aircraft having sweptback wings.

A solution to the above-described problem as taught by the parent case, Serial No. 320,164, has been achieved by combining with each of the main wings of an aircraft utilizing sweptback wings an auxiliary forewing properly positioned and arranged with respect to its corresponding main wing.

The auxiliary forewing according to the invention fits snugly against the upper forward surface of each of the main wings, effectively forming a unitary wing structure, and is arranged to pivot forward away from the main wing, with greatest relative movement at its outer portion, during periods of reduced speed, e. g., while landing or while taking off, to enhance the lift of the craft. Such pivotal movement takes place about a fixed axis located adjacent the leading edge of the main wing and substantially spaced from the outer portion thereof. Means are generally provided for controlling pivotal movement of the forewing about this axis.

Preferably, the pivotal axis is positioned at an oblique angle somewhat inclined from a perpendicular to the plane of flight to enable the forewing to be pivoted in an arc forward and downward away from the surface of the main or sweptback wing and into the optimum position for high lift. Further, the tips of the forewing extend substantially to the main or sweptback wing tips so that when the forewing is pivoted forward into its operative position, the effective span of the sweptback wing is increased.

The use of a forewing, as described above, particularly in combination with a sweptback wing in high speed aircraft of this type, has several functions and advantages. These include reduction of sweepback at low speeds, provision of high lift, and reduction or complete elimination of the tendency of such craft toward wing tip stalling not only during landing and takeoff, but also while cruising at low speeds. Further, formation of a slot between the forewing and its corresponding sweptback wing also improves the stalling and landing characteristics of the craft. The decreased wing taper ratio of the overall wing surface effected by the invention structure further aids in this respect. Movement of the forewing into its operative position, bringing about an increase in the effective span of a sweptback wing results in reduction of induced drag, improving the gliding angle of such craft. Moreover, pivotal movement of the forewing to its extended operative position produces considerable increase in wing area, causing a large reduction of "wing loading" and landing speed and further shifts the overall center of pressure of the wing area forward, resulting in automatic "trimming" for landing. All of the foregoing advantages are accomplished by provision of a simple auxiliary wing structure in accordance with the invention principles.

With the construction as taught in the parent case, there are certain inherent disadvantages which occur in such structure if utilized with high aspect ratio wings. The main wing and associated forewing form a unitary wing structure when in highspeed flight which is fully as satisfactory as on presently employed sweptback wings. However, when the auxiliary forewing is pivoted forwardly and downwardly into operative position, the rigidity of the two separate wings is decreased in certain flight attitudes; and the bending and torsion strengths of the two individual wings may be less than when in high speed position.

The aforementioned disadvantages may be alleviated by a construction as shown in the present invention wherein the split aircraft wing structure is utilized in conjunction with a high-speed aircraft of the type in which the engines thereof are suspended below the wings by pylons. Two or more of the pylons of such aircraft, according to the present invention, are provided with a slot therein which is engaged by suitable shoe members pivotally connected to the auxiliary forewing thereby providing an interconnection between the main wings of the aircraft and the auxiliary forewing associated therewith throughout the pivotal movement of the forewing. In this manner, a structural interconnection between the main wing and its associated forewing laterally outward of the fixed pivotal axis of the forewing is provided at all times.

The interconnection between the main wing and its associated forewing provides greater rigidity to each of the wings and the maximum bending loads on either wing are lowered due to the transferral of a portion of such loads through the aforementioned interconnection to the other wing. In addition, the torsion stiffness of each of the wings is substantially increased.

In aircraft of the type employing engines dependent from the wing by means of pylons, there is an additional problem presented during landing maneuvers of the aircraft due to the torsion on the main wings created by the engines thereof, since the center of gravity of the engines is generally forward of the wing. This problem is alleviated by shifting the auxiliary forewing forward over or beyond the center of gravity of the associated dependent engines.

An object of the present invention is the provision of a new and novel split aircraft wing providing a structure of greater rigidity and wherein the maximum loads on either wing are reduced to a minimum.

Another object is to provide a split aircraft wing structure wherein the torsion stiffness of the main wing and the auxiliary forewing is substantially increased.

A further object of the invention is the provision of a split aircraft wing structure utilized in conjunction with aircraft having engines dependent by means of pylons from the main wings thereof, wherein the torsion on the main wing is reduced during landing maneuvers thereof.

Yet another object is to provide a new and novel split aircraft wing structure which is simple and employs a minimum of parts, yet is sturdy and efficient in operation.

Other objects and many of the attendant advantages of this invention will be readily appreciated as the same becomes better understood by reference to the following detailed description when considered in connection with the accompanying drawing wherein.

Figure 1:
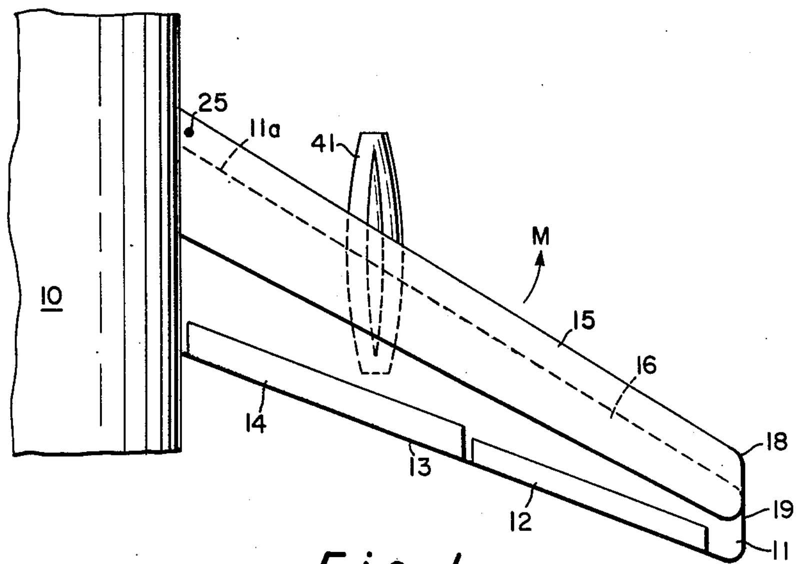
Fig. 1 is a plan view of a portion of an aircraft employing a wing structure according to the present invention.
Figure 3:
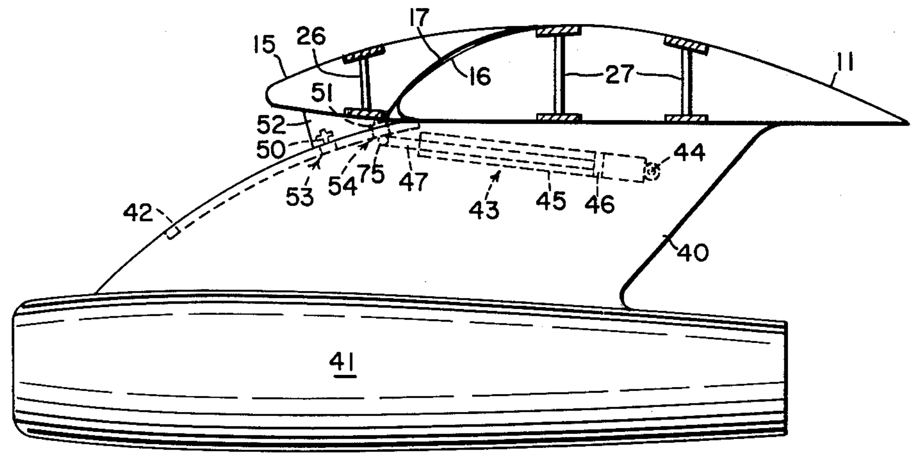
Fig. 3 is a schematic cross-section of the wing structure shown in Fig. 1.

Referring now to the drawings wherein like reference characters designate corresponding parts throughout the several views, there is shown in Fig. 1 a portion 10 of the fuselage of a high-speed aircraft having a pair of sweptback wings extending laterally and oppositely therefrom, only one 11 of which is shown. Wing 11 has a conventional aileron 12 mounted on the outer portion of its trailing edge 13 and a conventional flap 14 adjacent the aileron on the inner portion of said trailing edge. An auxiliary forewing 15 in accordance with the invention fits snugly against the upper forward surface 16 of main wing 11, the rear surface 17 of the forewing as seen in Fig. 3 having substantially the same contour as upper forward surface 16. It should be noted that while the outer edges of surfaces 16 and 17 are in tight contact with one another, the inner portions of these surfaces are a slight distance apart and are actually not in contact. Accordingly, the term "snug" as employed in this application is intended to include the immediately foregoing type of structure. The tips 18 of forewing 15 extend substantially to the tips 19 of main wing 11 and it may be seen that the auxiliary forewing has substantially the same span as the main wing. It is apparent that when the forewing is in snug engagement with the main wing, it effectively forms a single wing and suitable means (not shown) may be provided for securing the forewing to the main wing when in high speed flight.

Figure 6:
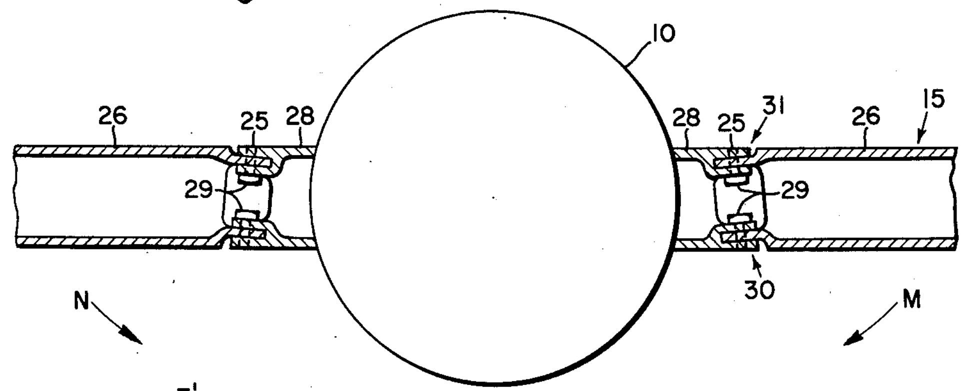
Fig. 6 is a schematic sectional view as seen from the aft portion of the fuselage showing the manner in which the auxiliary forewings are supported by the fuselage of the aircraft.

Forewing 15 is arranged to pivot forward about a fixed axis 25 located closely adjacent the leading edge 11*a* of main wing 11 and also closely adjacent fuselage 10 of the aircraft. Referring now to Fig. 3, the pivotal axis 25 is positioned along spar 26 of the forewing, the main wing containing two similar spars 27. As seen in Fig. 6, the hinge or pivotal axis 25 may be formed by the connection between spar 26 and the inner spar 28 of the forewing which is suitably secured to the fuselage of the aircraft. Spars 26 and 28 are pivotally connected at the ends thereof by means of pins or bolts 29 fastening the respective lower and upper tongue and groove connections 30 and 31 of the spars.

Figure 2:
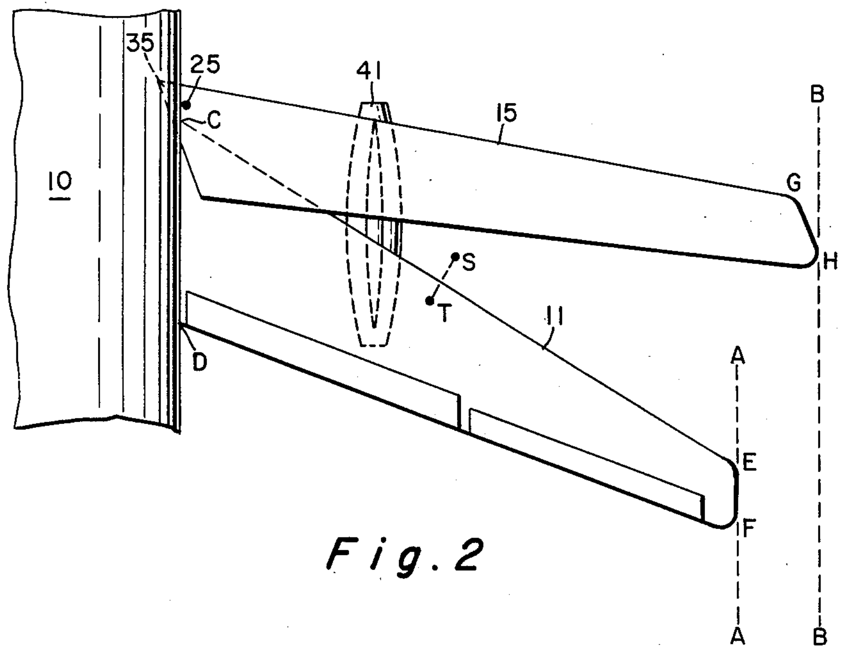
Fig. 2 is a plan view of the structure shown in Fig. 1 with the auxiliary forewing thereof in operative position.
Figure 4:
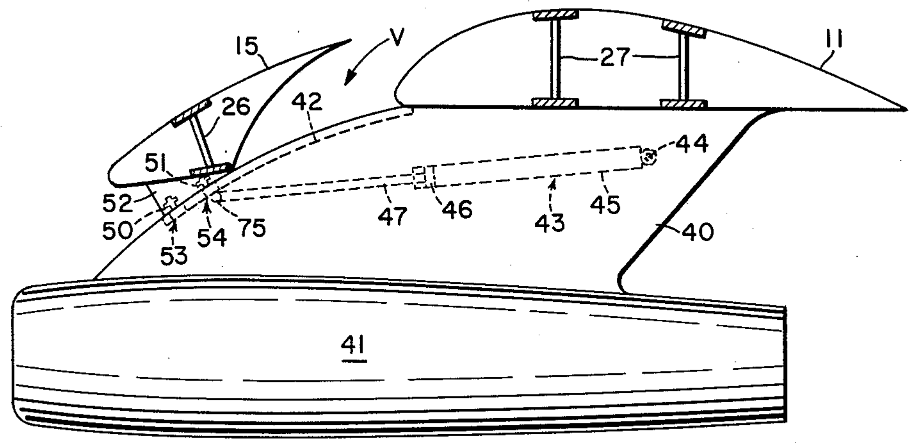
Fig. 4 is a schematic cross-section of the wing structure shown in Fig. 2.
Figure 7:
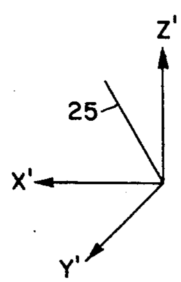
Fig. 7 is a diagrammatic view illustrating the relationship of the pivot axis of an auxiliary forewing to the principal aircraft axes.

Referring now to Fig. 7, X', Y', and Z' represent axes which are parallel to the principal axes of the aircraft, i. e., the roll axis, pitch axis and yaw axes, respectively. The bolts 29 which connect spars 26 and 28 are so aligned that the pivotal axis 25 of each auxiliary forewing slopes forwardly of a plane defined by the Y and Z principal axes of the aircraft and upwardly and laterally inward toward the plane defined by the X and Z principal axes of the aircraft. In this manner, pivotal axis 25 has such a slope that when the right forewing, as seen in Fig. 6, is pivoted forward in a counterclockwise direction, indicated by arrow M in Figs. 1 and 6, the forewing 15 moves in an arc forward and simultaneously downward away from the surface of main wing 11 into its operative position as shown in Figs. 2 and 4 substantially perpendicular to the line of flight, forming a split wing type structure. It is apparent that the optimum extended position of forewing 15 is that wherein the forewing extends directly perpendicular to the line of flight of the aircraft. In conventional aircraft, the pylons may not extend sufficiently forward to permit the forewings to pivot into optimum position; but even though the forewing as shown in Fig. 2 is not in optimum position, it is pivoted forward to such an extent that the loss in efficiency is quite small as compared to that obtainable if the forewing were pivoted into position directly perpendicular to the line of flight.

When the left forewing as seen in Fig. 6 is pivoted forward in a clockwise direction, indicated by arrow N, this forewing also moves in an arc forward and simultaneously downward to its extended operative position opposite the right forewing. The right and left forewings are extended simultaneously by a suitable control means hereinafter described. In order to accommodate the upper inner edges 35 of each of the forewings adjacent the fuselage during pivotal movement of the forewing into its operative position, slots (not shown) are provided in the fuselage into which edge 35 of each forewing is conducted upon movement of the forewing into its operative position.

Pivotal movement of each forewing to its extended position when the craft is operating at low speeds, e. g., while landing, reduces the sweepback and effectively increases the span of the sweptback wings by twice the distance from A—A to B—B in Fig. 2. Such movement also provides a well formed slot V between each forewing and sweptback wing as seen in Fig. 4 and increases the overall wing area. Moreover, as seen in Fig. 2, the wing taper ratio is reduced from approximately $$\frac{CD}{EF}$$

to $$\frac{CD}{EF+GH}$$

when the forewing is in forwardlly extended position. Thus, movement of the forewings to their operative position provides considerably increased lift, practically eliminating the danger of wing tip stalling. Further, a forward shift of the overall center of pressure from a point T to a point S in Fig. 2 provides automatic trimming and increased maneuverability for landing.

As most clearly seen in Figs. 3 and 4, pylon 40 is secured to the lower surface of main wing 11 and at the lower portion thereof supports a conventional jet engine 41. The interior of pylon 40 is provided with an enclosed cavity and a longitudinally extending slot 42 is formed in the forward portion of the pylon for providing communication between the cavity within the pylon and the exterior thereof. An actuating means indicated generally by reference numeral 43 is pivotally mounted upon a laterally extending pin 44 which is rotatably journaled within the walls of the pylon. Actuating means 43 comprises a hollow cylinder 45 having a piston 46 slidably disposed therein, a rod 47 being connected to the piston and extending through a sealed opening in one end of the cylinder. Suitable means (not shown) under control of the pilot of the aircraft is provided for selectively hydraulically actuating the piston within the cylinder from one end of the cylinder to the other thereof in a conventional manner. It should be noted that the forewings may be automatically actuated by the air forces acting thereon if desired.

Lateral slots 50 and 51 are provided in a housing 52 which extends below the lower surface of forewing 15 and two shoe assemblies 53 and 54, hereinafter more fully described, have one end thereof slidably disposed within slots 50 and 51 respectively, the opposite ends of each shoe assemblies 53 and 54 being slidably disposed within slot 42 in the forward portion of the pylon. Shoe assemblies 53 and 54 provide an interconnection between main wing 11 and forewing 15 through the intermediary of pylon 40 throughout the pivotal movement of the forewing.

It is apparent that since the auxiliary forewing pivots about an oblique axis 25, the shoe assemblies travel along slot 42 in the pylon and will be translated in a lateral direction within slots 50 and 51, thereby maintaining a rigid connection between the forewing and the pylon at all times.

Figure 5:
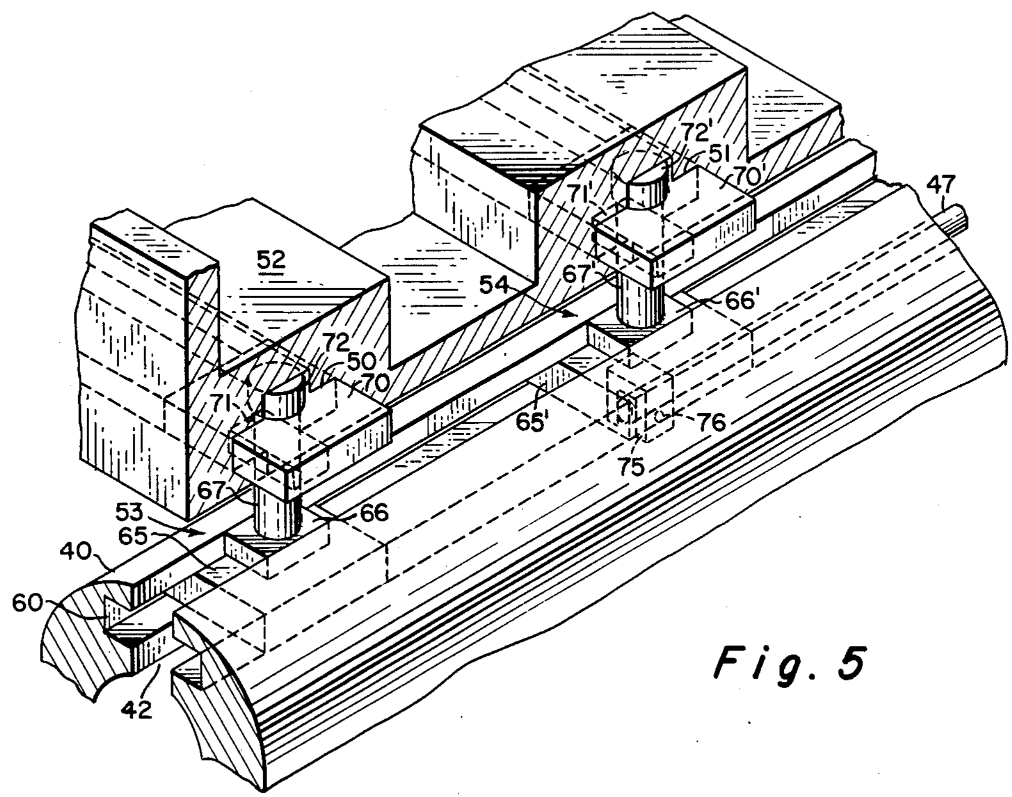
Fig. 5 is an enlarged sectional perspective view of a portion of the structure shown in Fig. 3.

Referring now to Fig. 5 which more clearly discloses the structure of the shoe assemblies 53 and 54, it may be seen that upwardly extending slot 42 provides communication between the cavity within the pylon and the exterior of the pylon and intersects a co-extensive, laterally extending slot 60 formed in the walls of the pylon. Shoe assembly 53 comprises a first rectangular shoe 65 which fits snugly within and is slidably disposed in laterally extending slot 60. A smaller rectangular guide portion 66 is suitably secured as by welding to the upper surface of shoe 65 and fits snugly within and is slidably disposed in the upper portion of slot 42. A short cylindrical stud 67 is suitably secured to and extends upwardly from the upper surface of guide portion 66. A shoe 70 similar to shoe 65 fits snugly within and is slidably disposed in slot 50 and has a guide portion 71 suitably secured to the lower surface thereof, guide portion 71 being similar to guide portion 66 and fitting snugly within and being slidably disposed within the lower reduced portion of slot 50. Stud 67 extends upwardly through suitable openings formed centrally within members 70 and 71, the upper portion of stud 67 being provided with an enlarged head portion 72 which limits displacement of shoe 70 and away from shoe 65 along stud 67.

Shoe assembly 54 is identical with shoe assembly 53 and corresponding parts thereof have been given similar reference characters which have been primed. The lower surface of shoe 65′ of shoe assembly 54 is provided with a downwardly extending portion 75 which is pivotally connected by means of a pin 76 to the outer end of rod 47 thereby providing an interconnection between the forewing 15 and the actuating means 43 therefor.

The operation of the device is as follows:

Assuming that the auxiliary forewing is in position for high speed flight as shown in Figs. 1 and 3 and it is desired to effectively reduce the stalling speed of the aircraft, the pilot of the aircraft operates a suitable control means within the cockpit which applies fluid pressure to the rear of piston 46 within cylinder 45 and forces the piston forwardly to the position shown in Fig. 4. This causes the auxiliary forewing 15 to pivot forwardly about its pivotal axis 25, and it should be understood that the similar forewing associated with the main wing opposite wing 11 is simultaneously pivoted foreward into operative position. As forewing 15 moves forwardly, shoes 70, 70′ are translated laterally within lateral slots 50, 51 and shoes 65, 65′ are translated longitudinally within slot 60 into the position shown in Fig. 4 wherein the forward end of shoe 65 engages the forward end of slots 42 and 60. It is also apparent that shoe 70 pivots about stud 67 upon such relative movement of the forewing and the main wing. In order to return the forewing to high speed position, the pilot operates a suitable control to apply fluid pressure forewardly of piston 46 which returns the forewing structure to the position shown in Fig. 3.

A single shoe assembly may be substituted for the two shoe assemblies 53 and 54, but two such assemblies are considered preferable for increasing the torsional strength of the two wings, and it is apparent that more than two shoe assemblies may be employed if desired. Furthermore, it is obvious that if more than one pylon is dependent from one of the main wings, a shoe assembly and slot interconnection may be provided between each of such pylons and the associated forewing. Such structure may be employed in conjunction with pylons of any nature which may have associated supported structures other than engines such as fuel tanks, radomes or pontoons.

It is apparent that with the structure shown, the shoe assemblies as disclosed cannot be rigidly secured to the auxiliary forewings due to the relative motion between the forewings and the associated pylons when the forewings are extended into operative position. However the shoe assemblies may be fixed to the auxiliary forewings if the slot within the pylon is suitably curved to compensate for the relative movement between the forewing and the pylon. Such a curved slot may be obtained by slightly curving the pylon itself or by simply providing a curved slot in the forward portion of the pylon if the pylon is wide enough to accommodate such a construction.

It is apparent from the foregoing that there is provided a new and novel split aircraft wing structure wherein the rigidity of the main wing and the auxiliary forewing is increased and the maximum loads on either of such wings are reduced when the auxiliary forewing is in extended operative position. The torsion stiffness of the main wing and the auxiliary forewing is increased, and the torsion on the wing during landing operations is substantially reduced since the auxiliary forewing is pivoted forwardly over or beyond the center of gravity of the engine which is supported by the pylon from the lower surface of the main wing. The invention structure is simple and employs a minimum of parts and yet is sturdy and efficient in operation.

I claim:

1. An aircraft structure which comprises a fuselage, sweptback wings extending laterally from both sides of said fuselage, each of said wings having in combination therewith an auxiliary forewing fitting snugly against the upper forward surface thereof, each of said forewings being pivotally mounted on a fixed axis located closely adjacent the leading edge of said sweptback wings and in the innermost portion of said forewings, said axes sloping forwardly of a plane defined by the Y and Z principal axes of the aircraft and upwardly and laterally inward toward a plane defined by the X and Z principles axes of the aircraft whereby said forewings are pivotally movable in an arc forward and downward away from the surface of said sweptback wings with greatest relative movement of the outer portion of said forewings, pylon means supported by each of said wings and extending forwardly and downwardly of said wings, means for connecting each of said forewings and the associated pylon throughout the pivotal movement of said forewings, and means for controlling pivotal movement of said forewings about said pivotal axes.

2. An aircraft structure as defined in claim 1 wherein the connecting means between each of said forewings and the associated pylon is positioned laterally outward of the fixed axis of the associated forewing for increasing the rigidity of and lowering the maximum loads on the wings and forewings when the forewings are in extended operative position.

3. An aircraft structure as defined in claim 2 wherein said pivotal axes are located closely adjacent the fuselage and said forewings have substantially the same span as said sweptback wings.

4. An aircraft structure which comprises a fuselage, sweptback wings extending laterally from both sides of said fuselage, each of said wings having in combination therewith an auxiliary forewing fitting snugly against the upper forward surface thereof, each of said forewings being pivotally mounted on a fixed axis located closely adjacent the leading edge of said sweptback wings and in the innermost portion of said forewings, said axes sloping forwardly of a plane defined by the Y and Z principal axes of the aircraft and upwardly and laterally inward toward a plane defined by the X and Z principal axes of the aircraft whereby said forewings are pivotally movable in an arc forward and downward away from the surface of said sweptback wings with greatest relative movement at the outer portion of said forewings, at least one laterally extending slot formed in a portion of each of said forewings, pylon means supported by each of said wings and extending forwardly and downwardly of said wings, a substantially longitudinally extending slot formed in a portion of at least one of said pylon means associated with each of said wings, a plurality of shoe assembly means each of which has a first shoe member at one end thereof and a second shoe member at the opposite end thereof, each of said first shoe members being slidably disposed within the slot in the associated pylon means and each of said second shoe members being slidably disposed within said laterally extending slot in the associated forewing, means for limiting relative movement between the first and second shoe members of each of said shoe assemblies, and means for controlling pivotal movement of said forewings about said pivotal axes.

5. An aircraft structure as defined in claim 4 wherein there are a plurality of laterally extending slots formed in each of said forewings, each of said laterally extending slots having one shoe member of a shoe assembly slidably disposed therein, the opposite shoe member of each of said shoe assemblies being slidably disposed within the slot in the associated pylon means.

6. An aircraft structure as defined in claim 5 wherein said pivotal axes are located closely adjacent the fuselage and said pylon means are positioned laterally outward of the fixed axis of the associated forewing.

References Cited in the file of this patent

UNITED STATES PATENTS

| | | |
|---|---|---|
| 1,606,117 | Caples | Nov. 9, 1926 |
| 2,683,574 | Peterson | July 13, 1954 |

FOREIGN PATENTS

| | | |
|---|---|---|
| 210,181 | Great Britain | Jan. 31, 1924 |
| 493,655 | Great Britain | Oct. 12, 1938 |